US010726317B2

(12) United States Patent
Ramasamy et al.

(10) Patent No.: US 10,726,317 B2
(45) Date of Patent: Jul. 28, 2020

(54) METHODS AND SYSTEMS FOR ADDING NEW CONTENT IN AN ELECTRONIC DOCUMENT GENERATED BY SCANNING

(71) Applicant: XEROX CORPORATION, Norwalk, CT (US)

(72) Inventors: Mahesh Ramasamy, Ariyalur (IN); Sudhagar Subbaian, Coimbatore (IN)

(73) Assignee: Xerox Corporation, Norwalk, CT (US)

( * ) Notice: Subject to any disclaimer, the term of this patent is extended or adjusted under 35 U.S.C. 154(b) by 51 days.

(21) Appl. No.: 15/596,337

(22) Filed: May 16, 2017

(65) Prior Publication Data

US 2018/0336444 A1 Nov. 22, 2018

(51) Int. Cl.
*G06F 3/00* (2006.01)
*G06K 15/02* (2006.01)
*H04N 1/387* (2006.01)
*G06K 9/00* (2006.01)
*G06F 40/103* (2020.01)

(52) U.S. Cl.
CPC ....... *G06K 15/1889* (2013.01); *G06F 40/103* (2020.01); *G06K 9/00442* (2013.01); *H04N 1/387* (2013.01); *H04N 1/3872* (2013.01)

(58) Field of Classification Search
CPC . G06F 17/211; G06F 40/103; G06K 9/00442; G06K 15/1889; H04N 1/3872; H04N 1/387
See application file for complete search history.

(56) References Cited

U.S. PATENT DOCUMENTS

| 7,586,654 | B2* | 9/2009 | Hoberock | H04N 1/3871 358/403 |
| 8,094,973 | B2* | 1/2012 | Bernal | G06T 1/00 382/298 |
| 8,937,744 | B1* | 1/2015 | Shah | G06F 3/1219 358/1.2 |
| 2003/0147099 | A1 | 8/2003 | Heimendinger et al. | |
| 2006/0278724 | A1* | 12/2006 | Walker | G06F 17/211 235/494 |
| 2012/0128249 | A1* | 5/2012 | Panjwani | G06K 9/00469 382/177 |
| 2018/0150435 | A1* | 5/2018 | Kim | G06F 17/212 |

* cited by examiner

*Primary Examiner* — Kyle R Stork
(74) *Attorney, Agent, or Firm* — Jones Robb, PLLC

(57) ABSTRACT

Disclosed herein are methods and systems for adding content in a page of an electronic document without moving current content to a next page of the electronic document. A first electronic document, a position information of a page of the first electronic document where a new content need to be added, and at least one of the new content and a second electronic document including the new content are received at an MFD. A required space for adding the new content and an available space between lines of the page are estimated. The available space and the required space are compared to check whether the available space is more than the required space. Based on the comparison, the lines of the page are re-positioned, and the new content is added on the page based on the position information to generate an updated first electronic document including the added new content.

16 Claims, 23 Drawing Sheets

706

THE WELL UNDERSTOOD METHOD WAS PROPOSED
|10|
AND IMPLEMENTED. THE INVENTOR'S DETAILS
|9|
MENTIONED BELOW.
|7| 1. INVENTOR 1, INDIA
|7| 2. INVENTOR 2, US
|6| 3. INVENTOR 3, INDIA
|6| ABOVE INVENTOR'S LIST WAS ACCEPTED AND THIS
|6| WILL BE FORWARDED FOR PATENT FILING. THIS
|7| METHOD WILL CONFIDENTIAL, DON'T SHARE THIS
|7| WITH ANYONE.
|28|

FIG. 7B 702
704
| 4. INVENTOR 4, INDIA | NEEDED SPACE 20 |

FIG. 7A

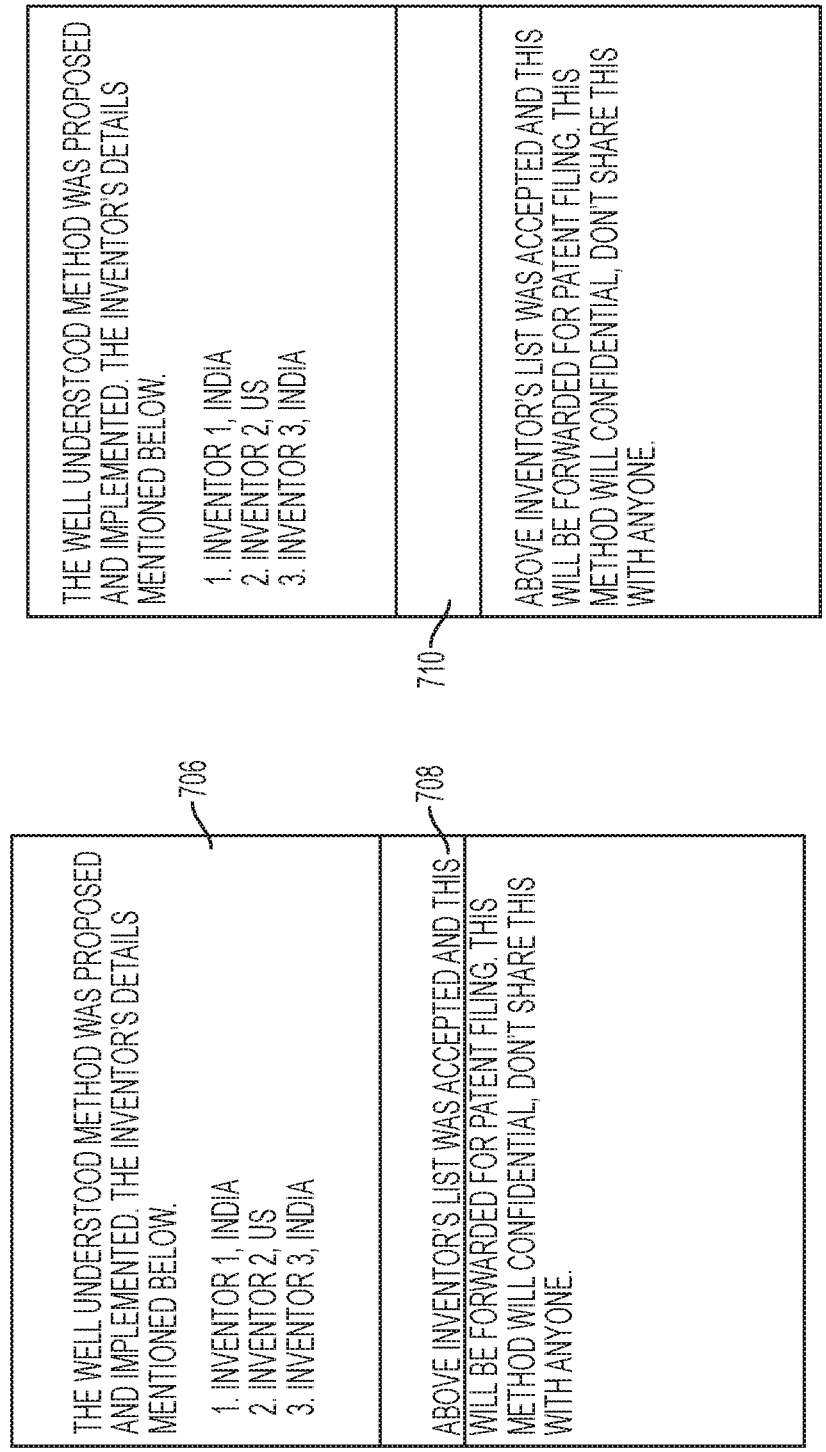

The H.264 video format has a very broad application range that covers all forms of digital compressed video from low bit-rate Internetstreaming applications to HDTV broadcast and Digital Cinema applications with nearly lossless coding. With the use of H.264, bit rate savings of 50% or more compared to MPEG-2 Part 2 are reported. For example, H.264 has been reported to give the same Digital Satellite TV quality as current MPEG-2 implementations with less than half the bitrate, with current MPEG-2 implementations working at around 3.5 Mbit/s and H.264 at only 1.5 Mbit/s.[3] Sony claims that 9 Mbit/s AVC recording mode is equivalent to the image quality of the HDV format, which uses approximately 18-25 Mbit/s.[4] The H.264 video format has a very broad application range that covers all forms of digital compressed video from low bit-rate Internet streaming applications to HDTV broadcast and Digital Cinema applications with nearly lossless coding. With the use of H.264, bit rate savings of 50% or more compared to MPEG-2 Part 2 are reported. For example, H.264 has been reported to give the same Digital Satellite TV quality as current MPEG-2 implementations with less than half the bitrate, with current MPEG-2 — 806

808 —

Please Enter Your text here... or press next to get image as input around 3.5 Mbit/s and H.264 at only 1.5 Mbits.[3] Sony claims that 9 Mbit/s AVC recording mode is equivalent to the image quality of the HDV format, which uses approximately 18-25 Mbit/s.[4] The H.264 video format has a very broad application range that covers all forms of digital compressed video from low bit-rate Internet streaming applications to HDTV broadcast and Digital Cinema. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding.

FIG. 8B

The H.264 video format has a very broad application range that covers all forms of digital compressed video from low bit-rate Internetstreaming applications to HDTV broadcast and Digital Cinema applications with nearly lossless coding. With the use of H.264, bit rate savings of 50% or more compared to MPEG-2 Part 2 are reported. For example, H.264 has been reported to give the same Digital Satellite TV quality as current MPEG-2 implementations with less than half the bitrate, with current MPEG-2 implementations working at around 3.5 Mbit/s and H.264 at only 1.5 Mbit/s.[3] Sony claims that 9 Mbit/s AVC recording mode is equivalent to the image quality of the HDV format, which uses approximately 18-25 Mbit/s.[4] The H.264 video format has a very broad application range that covers all forms of digital compressed video from low bit-rate Internet streaming applications to HDTV broadcast and Digital Cinema applications with nearly lossless coding. With the use of H.264, bit rate savings of 50% or more compared to MPEG-2 Part 2 are reported. For example, H.264 has been reported to give the same Digital Satellite TV quality as current MPEG-2 implementations with less than half the bitrate, with current MPEG-2 — 810

804 — The H.264 video format has a very broad application range that covers all forms of digital implementations working at around 3.5 Mbit/s and H.264 and only 1.5 Mbit/s.[3] Sony claimas that 9 Mbit/s AVC recording mode is equivalent to the image quality of the HDV format, which uses approximately 18-25 Mbit/s.[4] The H.264 video format has a very broad application range that covers all forms of digital compressed video from low bit-rate Internet streaming applications to HDTV broadcast and Digital Cinema applications with nearly lossless coding. With the use of H.264, bit rate savings of 50% or more compared to MPEG-2 Part 2 are reported. For example, H.264 has been reported to give the same Digital Satellite TV quality as current MPEG-2 implementations with less than half the bitrate, with current MPEG-2 implementations working at around 3.5 Mbit/s and H.264 at only 1.5 Mbits.[3] Sony claims that 9 Mbit/s AVC recording mode is equivalent to the image quality of the HDV format, which uses approximately 18-25 Mbit/s.[4] The H.264 video format has a very broad application range that covers all forms of digital compressed video from low bit-rate Internet streaming applications to HDTV broadcast and Digital Cinema. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding. The H.264 video format has a very broad application range that covers all forms of digital compressed video from low bit-rate Internetstreaming applications to HDTV broadcast and Digital Cinema applications with nearly lossless coding.

FIG. 8C

METHODS AND SYSTEMS FOR ADDING NEW CONTENT IN AN ELECTRONIC DOCUMENT GENERATED BY SCANNING

TECHNICAL FIELD

The presently disclosed subject matter relates to the field of adding content in scanned images, and more particularly to methods and systems for adding new content on a page of a scanned image and/or an electronic document without moving current content to a next page of the electronic document. The electronic document may be generated by scanning a physical document using a scanner.

BACKGROUND

Document scanners are widely available and are used for digitization, such as scanning, of documents. The digitized documents or scanned images may not be easily editable. Sometimes, there may arise need for adding content like text, image, graphics, etc., in a scanned image.

Presently, there exist tools for adding content in scanned images. An existing tool for adding content, adds whitespaces at a specific location in a scanned image, and then may insert new content into the specified location. To add the whitespaces, a portion of existing content of the document is moved based on the amount of whitespace or lines required for the new content. Hence, the page content may grow in size by the amount of the whitespace/lines required for the new content. At times, the content moves to the next or an additional page. This may result in change in formatting of the scanned image and number of pages in the scanned image.

Adding new content to a page of an electronic document or scanned image without moving the current content to next page of the document remains a challenge and a function, which is lacking in existing techniques and devices. Hence, in light of the limitations with existing techniques, there arises a need for improved methods and systems for adding new content in electronic documents.

SUMMARY

According to aspects illustrated herein, there is provided a method for adding content in at least one page of an electronic document without moving current content to a next page in the electronic document. A first electronic document is received. Then at least one position information of the page of the first electronic document where a new content to be added, is received. The new content needs to be added on the page of the first electronic document. Then, at least one of the new content and a second electronic document including the new content is received from a user. Further, a required space including one or more pixels required for adding the new content is estimated based on the new content. Then an available space including a number of pixels available between a number of lines present in the page of the first electronic document is estimated. Thereafter, the available space is compared with the required space to check whether the available space is more than the required space. When the available space is more than the required space, then the lines of the page are re-positioned to make space for the new content according to the at least one position information. The new content is then be added on the page of the first electronic document based on the received at least one position information to generate an updated first electronic document including the added new content.

According to another aspect, there is provided a system for adding content in at least one page of an electronic document without moving current content to a next page in the electronic document. The system includes a multi-function device for receiving a first electronic document and at least one position information of a page of the first electronic document where a new content is to be added. The multi-function device is configured to receive at least of the new content and a selection of a second electronic document comprising the new content from a user. The multi-function device includes a content processing module configured to estimate a required space including one or more pixels required for adding the new content based on the new content; to estimate an available space including a number of pixels available between a number of lines present in the page of the first electronic document; to compare the available space with the required space to check whether the available space is more than the required space; to re-position the plurality of lines on the page to make space for the new content when the available space is more than the required space; and to add the new content on the page of the first electronic document based on the received at least one position information to generate an updated first electronic document comprising the added new content.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 7A-7E show exemplary electronic documents at various stages of adding new content, in accordance with various embodiments of the present disclosure.

FIGS. 8A-8C illustrate exemplary electronic documents, in accordance with various embodiments of the present disclosure.

DESCRIPTION

Figure 1A:
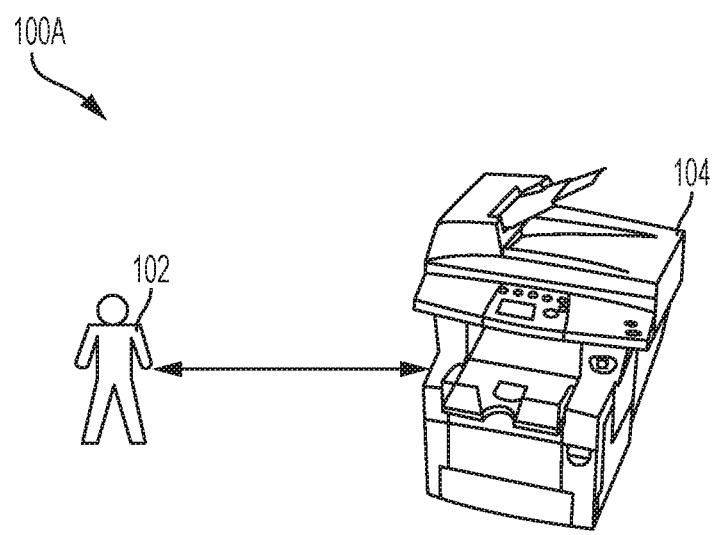
FIG. 1A is a schematic diagram illustrating an exemplary system for adding content in at least one page of an electronic document without moving current content to a next page in the electronic document, in accordance with an embodiment of the present disclosure.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below.

The term "electronic document" relates to a document. The electronic document may be an electronic image generated by scanning a physical document. The electronic document may be a scanned image generated by using a scanning device or a multi-function device. The electronic document may be in a suitable format such as, but not limited to, JPG or JPEG (Joint Photographic Experts Group) format, TIFF (Tag Index File Format), PNG (Portable network Graphics) format, GIF (Graphic Interchange Format), and so forth. Furthermore, the electronic document my include text, image, graphics, and so forth. The first electronic document refers to an electronic document which is to be modified to include new content. The first electronic document is generated by scanning a first physical document. The second electronic document refers to an electronic document that includes new content to be added to the first electronic document. The second electronic document is generated by scanning a second physical document.

Further, as used herein, a "multi-function device" is a device or a combination of multiple devices that are configured to perform one or more functions such as, but not limited to, scanning, printing, cutting, imaging, and so forth. The multi-function device may include software, hardware, firmware, and combination thereof.

Further, as used herein, a "scanning device" is a device configured to scan one or more documents and to create a scanned image. The scanning device may or may not be a part of the multi-function device. The scanning device may include software, hardware, firmware, and combination thereof.

As used herein, a "content processing module" is a device or a combination of multiple devices configured to process content of electronic documents. In context of the current disclosure, the content processing module is configured to add new content on a page of an electronic document, first electronic document, for example.

Further, as used herein, a "computing device" refers to a device for communicating and exchanging data, such as, but not limited to scanned images, with the multi-function device. Further, the computing device is configured to connect to a network for interacting and exchanging data with the multi-function device. Examples may include, but are not limited to, a phone, a smart phone, a tablet computer, a computer, a laptop, and any other suitable communication device.

Overview

The disclosure generally relates to systems and methods for adding content in at least one page of an electronic document without moving current content to a next page in the electronic document. Addition of the new content may not result in addition of new page in a multi-page electronic document. A user may provide a first electronic document, and at least one position information of a page of the first electronic document where a new content is to be added at a multi-function device (MFD). The user also provides at least one of the new content or a selection of second electronic document including the new content. In the first electronic document, the new content needs to be added. The MFD estimates a required space based on the new content. The MFD also estimates an available space on the page of the first electronic document. The available space include whitespaces between a number of lines on the page. When the available space is more than the required space then the MFD re-positions the lines of the page to make space for the new content. The MFD then adds the new content on the page of the first electronic document based on the position information to generate an updated first electronic document including the added new content. The disclosed system is configured to add and accommodate the new content in the page of the first electronic document without moving current content of the page to the next page. When the available space is less than or equal to the required space, then the MFD notifies the user about the same.

FIG. 1A is a schematic diagram illustrating an exemplary system 100A for adding content in at least one page of an electronic document without moving current content to a next page in the electronic document, in accordance with an embodiment of the present disclosure. In some embodiments, the electronic document is a soft copy of a physical document. The electronic document may be an electronic image generated by scanning a physical document. Further, the electronic document may be a scanned image generated using a scanning device or a multi-function device. The electronic document may be in a suitable format such as, but not limited to, JPG or JPEG (Joint Photographic Experts Group) format, TIFF (Tag Index File Format), PNG (Portable network Graphics) format, GIF (Graphic Interchange Format), and so forth. Furthermore, the electronic document my include text, image, graphics, and so forth.

The system 100A includes a user 102 and a multi-function device 104. The user 102 accesses the MFD 104 via a user interface of the MFD 104. The user 102 provides a selection of a first electronic document at the multi-function device 104. The user 102 also provides at least one position information of the page of the first electronic document where new content is to be added. In some embodiments, the user 102 provides a first electronic document at the MFD 104. The first electronic document may be a scanned input image. Further, the user 102 enters the new content and/or provides a selection of a second electronic document including the new content at the multi-function device (MFD) 104. In some embodiments, the user 102 may provide a physical document including the new content that needs to be added in the first electronic document.

The MFD 104 based on the inputs from the user 102 estimates a required space and an available space. In some embodiment, the MFD 104 requests the user 102 to provide the at least one position information post estimation of the available space including whitespaces in the page of the second electronic document. The required space includes one or more pixels required for adding the new content. In an embodiment of the present disclosure, the new content includes at least one of text, graphics, and images.

The MFD 104 estimates the required space based on the new content such as, number of lines, font size, font type, and so forth of the new content. In some embodiments, the MFD 104 estimates the required space based on the new content of the second electronic document. The MFD 104 estimates the available space including a number of pixels available between the number of lines present in the page of the first electronic document. In some embodiments, the available space includes whitespaces between the lines of the page of the first electronic document. The MFD 104 also determines a width of each of the number of lines present on the page of the second electronic document for estimating the whitespaces.

The MFD 104 further checks whether the available space is more than the required space. For example, the MFD 104 may compare the available space with the required space to determine whether the space is available for accommodating the new content on the page. In some embodiments, when the available space is more than the required space, the MFD 104 re-positions the lines on the page of the second electronic document to make space for the new content based on the received at least one position information. The MFD 104 extracts the new content from the second electronic document. Further, the MFD 104 adds the new content on the page of the first electronic document based on the received at least one position information to generate an updated first electronic document.

In some other embodiments, the MFD 104 removes one or more margins of the page of the first electronic document to make space available for the new content. In alternative embodiments, the MFD 104 changes a font size of the current content of the page to make space for adding the new content on the page when the available space is at least one of an equal to and less than the required space. In some embodiments, the MFD 104 notifies the user 102 when the space is not available for accommodating the new content on the page.

In some embodiments, the MFD 104 prints the updated first electronic document. The updated first electronic document is the first electronic document including the new content inserted at a specific location according to the position information. In alternative embodiments, the MFD 104 may save the updated first electronic document. In some other embodiments, the MFD 104 may send the updated first electronic document to other computing devices or users via a network. In some embodiments of the present disclosure, the new content is added to the first electronic document by extracting the new content from the second electronic document.

In some embodiments, the disclosed MFD 104 is configured to estimate one or more margins present in an electronic document such as the first and second electronic documents. The MFD 104 may also calculate space between each line and width of each line. The MFD 104 may minimize line space between each of the line with a correct ratio (refer to FIGS. 7D-7E) so as to make enough space available for adding the new content. Thereafter, the MFD 104 may receive position information from the user for inserting the new content. The MFD 104 may insert the new content according to the received at least one position information.

Figure 1B:
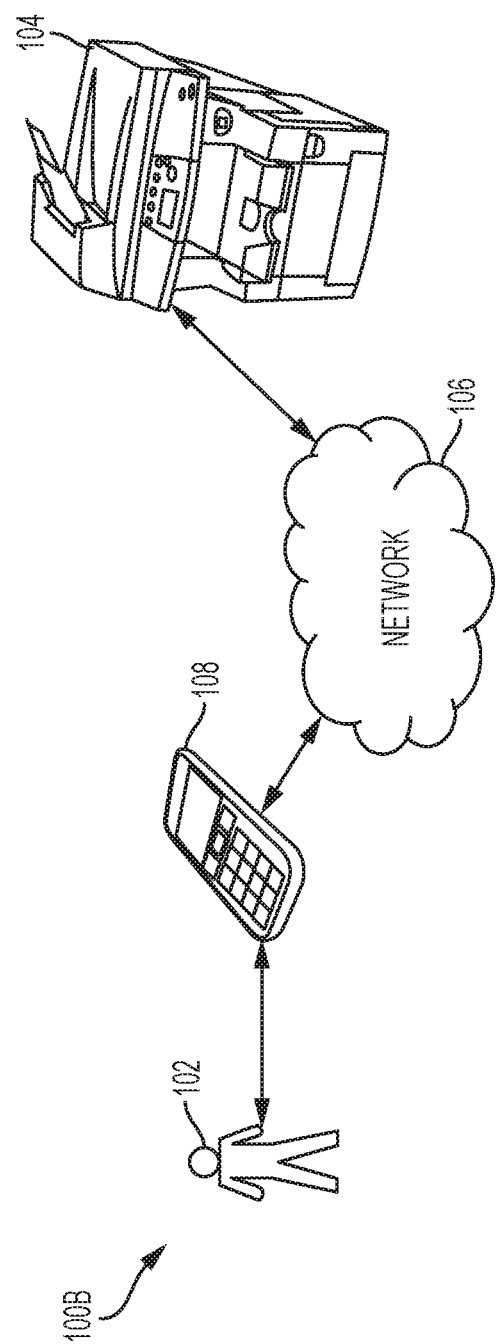
FIG. 1B is a schematic diagram illustrating another exemplary system for adding content in at least one page of an electronic document without moving current content to a next page in the electronic document, in accordance with another embodiment of the present disclosure.

FIG. 1B is a schematic diagram illustrating another exemplary system 100B for adding content in at least one page of an electronic document such as the first electronic document without moving current content to a next page in the electronic document, in accordance with another embodiment of the present disclosure. The system 100B primarily includes the user 102 associated with a computing device 108, the multi-function device 104, and a network 106. The computing device 108 may connect to the multi-function device 104 via the network 106. The network 106 can be a wired network, a wireless network, and combination thereof.

The user 102 may interact with the multi-function device 104 using the computing device 108. For example, the user 102 may send the first electronic document and a second electronic document including the new content to the multi-function device 104 by using the computing device 108 over the network 106. Further, the user 102 enters at least one position information at the computing device 108, which in turn is sent to the MFD 104 over the network 106. In some embodiments, the user 102 may provide multiple position information for adding content at more than one position or location within the second document.

The MFD 104 receives the new content and/or the second electronic document including the new content from the computing device 108. The MFD 104 also receives the first electronic document from the computing device 108. The MFD 104 processes current content of the first electronic document and adds the new content on the page of the first electronic document to generate the updated first electronic document. The MFD 104 then sends the updated first electronic document including the added new content to the computing device 108 over the network 106.

Figure 2:
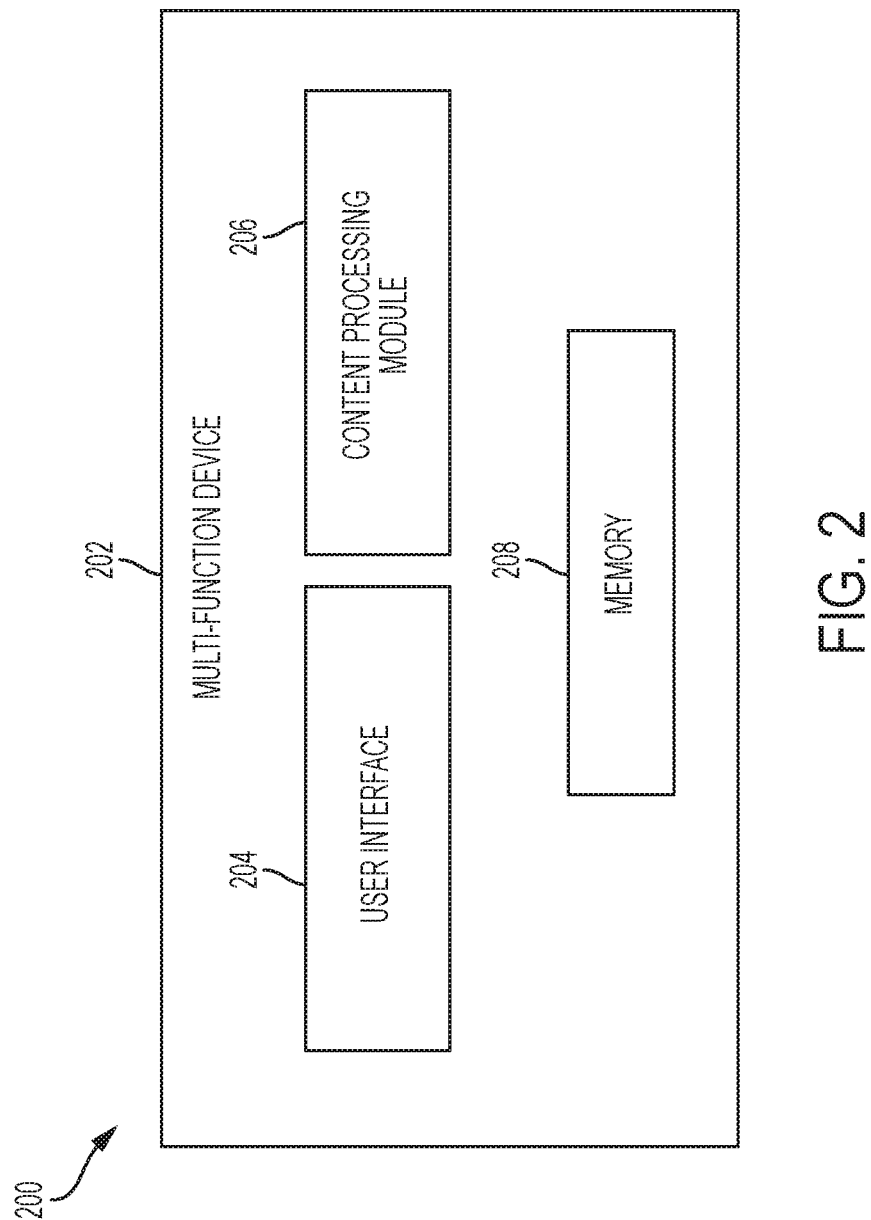
FIG. 2 is a block diagram illustrating various system elements of an exemplary multi-function device, in accordance with various embodiments of the present disclosure.

FIG. 2 is a block diagram 200 illustrating various system elements of an exemplary multi-function device 202, in accordance with various embodiments of the present disclosure. As shown, the multi-function device 202 primarily includes a user interface 204, a content processing module 206, and a memory 208. As discussed with reference to FIG. 1A, the user 102 may interact with the multi-function device 202 via the user interface 204. The user interface 204 is a graphical user interface including one or more graphical options that the user 102 may select for accessing one or more functionality of the multi-function device 202.

The MFD 202 receives one or more inputs from the user 102. The user 102 enters one or more inputs at the user interface 204. The MFD 202 receives a first electronic document. In some embodiments, the first electronic document is a soft copy of a physical document. The first electronic document may be an electronic image generated by scanning a physical document (i.e., a first physical document). Further, the first electronic document may be a scanned image generated by using a scanning device or a multi-function device. The first electronic document may be in a suitable format such as, but not limited to, JPG or JPEG (Joint Photographic Experts Group) format, TIFF (Tag Index File Format), PNG (Portable network Graphics) format, GIF (Graphic Interchange Format), and so forth. Furthermore, the first electronic document may include text, image, graphics, and so forth. In some embodiments, the first electronic document is a pre-stored electronic document. The new content needs to be added on a page of the first electronic document. In some embodiments, the MFD 202 may receive a first document, which is a physical document. In such embodiments, the MFD 202 may convert the first document into the first electronic document by scanning. The MFD 202 may further be configured to receive at least one position information of the page of the first electronic document where the new content is to be added.

Further, the MFD 202 receives at least one of: a new content and a selection of a second electronic document comprising the new content from the user 102. In some embodiments, the second electronic document is a soft copy of a physical document (i.e., a second physical document). The second electronic document may be an electronic image generated by scanning a physical document. Further, the second electronic document may be a scanned image generated by using a scanning device or a multi-function device. The second electronic document may be in a suitable format such as, but not limited to, JPG or JPEG (Joint Photographic Experts Group) format, TIFF (Tag Index File Format), PNG (Portable network Graphics) format, GIF (Graphic Interchange Format), and so forth. Furthermore, the second electronic document may include text, image, graphics, and so forth. In some embodiments, the second electronic document is a pre-stored electronic document. The new content may include such as, but not limited to, one or more images, text, and graphics.

The content processing module 206 is configured to estimate a required space including one or more pixels required for adding the new content. The content processing module 206 estimates the required space based on the new content. The content processing module 206 converts at least one of the new content and the second electronic document into a first binary image. The content processing module 206 calculates a first row histogram (Rh) based on a number of white pixels and a number of black pixels present in the new content. The content processing module 206 counts one or more black pixels for each of one or more lines of the new content, and stores a count based on the counting in the memory 208. The count is stored in an array when the new content includes at least one black pixel. The content processing module 206 determines a number of ideal rising points (RRp) and a number of ideal falling points (RRf) from the first row histogram. The ideal rising points (RRp) and the ideal falling points (RRf) include information about the one or more lines present of the new content. The content processing module 206 estimates at least one blank space between at least two of the one or more lines and a line size of each of the one or more lines of the new content. The required space may include the at least one blank space and the line size of each of the one or more lines.

Further, the content processing module 206 estimates an available space including a number of pixels available between a number of lines present in the page of the first electronic document. The content processing module 206 converts the first electronic document into a second binary image. The content processing module 206 calculates a second row histogram (Rh) based on a number of white pixels and a number of black pixels present on the page of the first electronic document. The content processing module 206 then counts one or more black pixels for each of the plurality of lines present on the page. A count based on the counting is stored in an array when current content of the page includes at least one black pixel. The content processing module 206 determines a number of ideal rising points (RRp) and a number of ideal falling points (RRf) from the second row histogram. The ideal rising points (RRp) and the ideal falling points (RRf) may include information about the lines present in the page. The content processing module 206 estimates at least one blank space between at least two of the lines and a line size of each the lines of the page. The available space may include the at least one blank space.

When the available space is more than the required space, then the content processing module 206 is configured to re-position the lines on the page to make enough space for addition of the new content. The content processing module 206 extracts the new content from the second electronic document. The content processing module 206 then adds the new content on the page of the first electronic document based on the received at least one position information to generate an updated first electronic document. The updated first electronic document includes the added new content.

In some other embodiments, the content processing module 206 removes one or more margins of the page of the first electronic document to make space available for the new content. The lines of the page are re-positioned such that one or more margins of the page of the first electronic document are utilized for making space available equal to the required space for adding the new content. In alternative embodiments, the content processing module 206 changes a font size and/or a font type of the current content of the page or of the first electronic document to make space available for adding the new content on the page when the available space is at least one of: equal to and less than the required space. In some embodiments, the MFD 202 notifies the user 102 when the space is not available or enough for accommodating the new content on the page of the first electronic device.

The multi-function device 202 is configured to print the updated first electronic document. In some embodiments, the multi-function device 202 is further configured to save the updated first electronic document. The updated first electronic document is saved in the memory 208. In alternatives embodiments, the multi-function device 202 is further configured to send the updated first electronic document to other computing devices and/or other users. For example, the updated first electronic document is sent to an email identifier (ID) of a user.

In some embodiments, when the available space is at least one of: equal to and less than the required space, then the MFD 202 may change a font size or font type of the current content of the page to make space for adding the new content on the page when the available space is at least one of: equal to and less than the required space.

In alternative embodiments, when the available space is at least one of: equal to and less than the required space, then the MFD 202 re-positions the lines such that one or more margins of the page of the first electronic document are utilized for making space equal to the required space available for adding the new content.

Figure 3A:
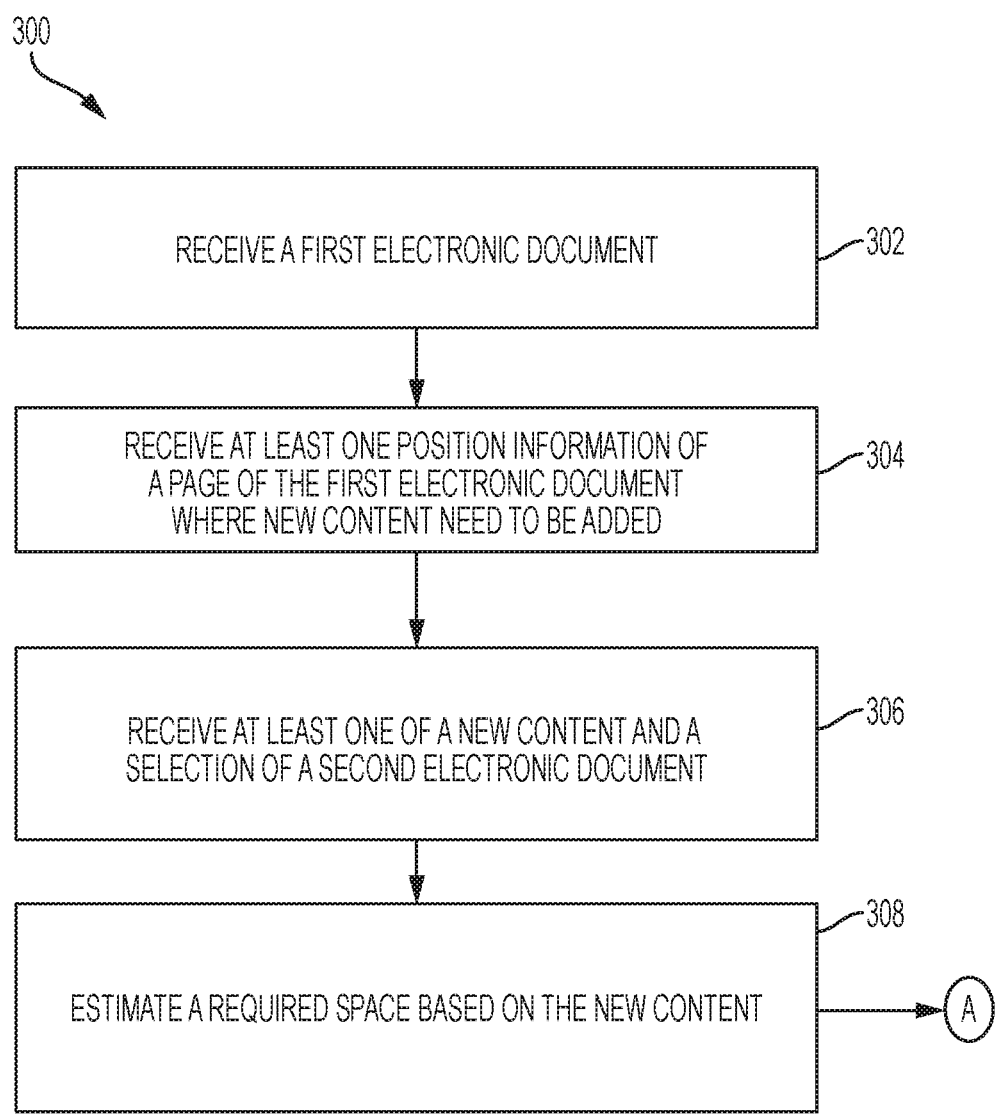
FIGS. 3A-3C represent a flowchart illustrating an exemplary method for adding content in at least one page of an electronic document without moving current content to a next page in the electronic document, in accordance with an embodiment of the present disclosure.
Figure 3B:
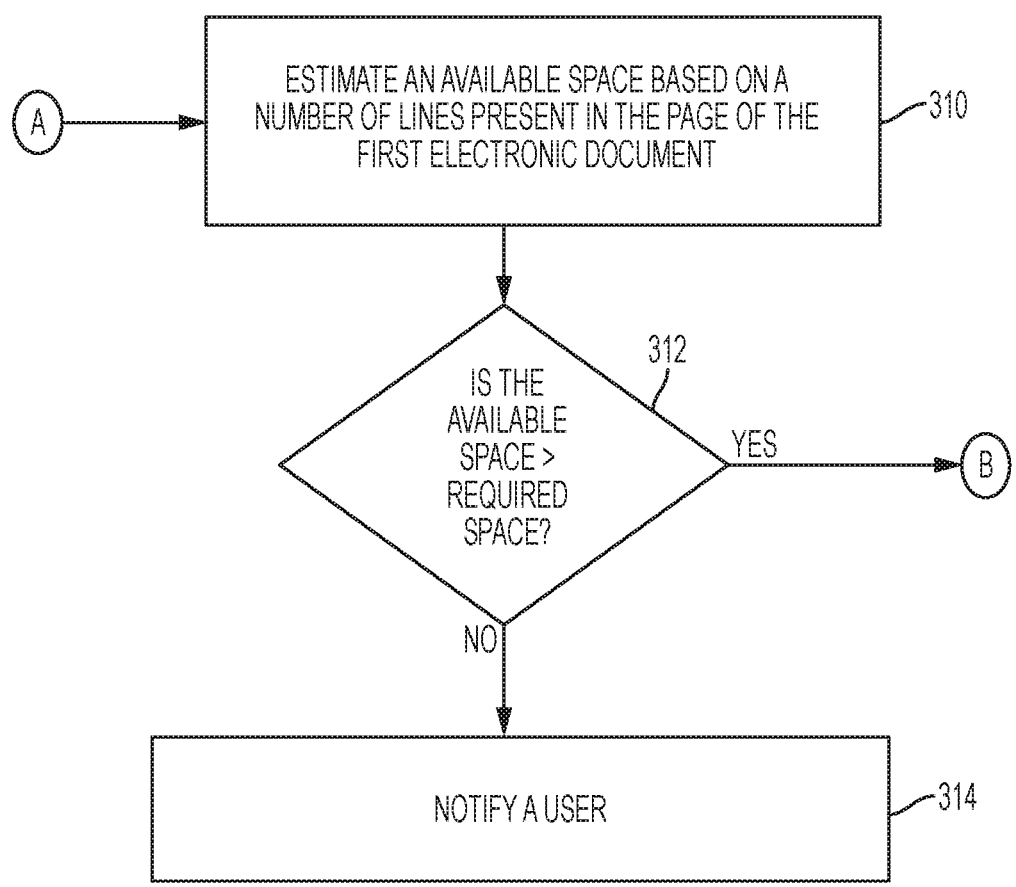
Figure 3C:
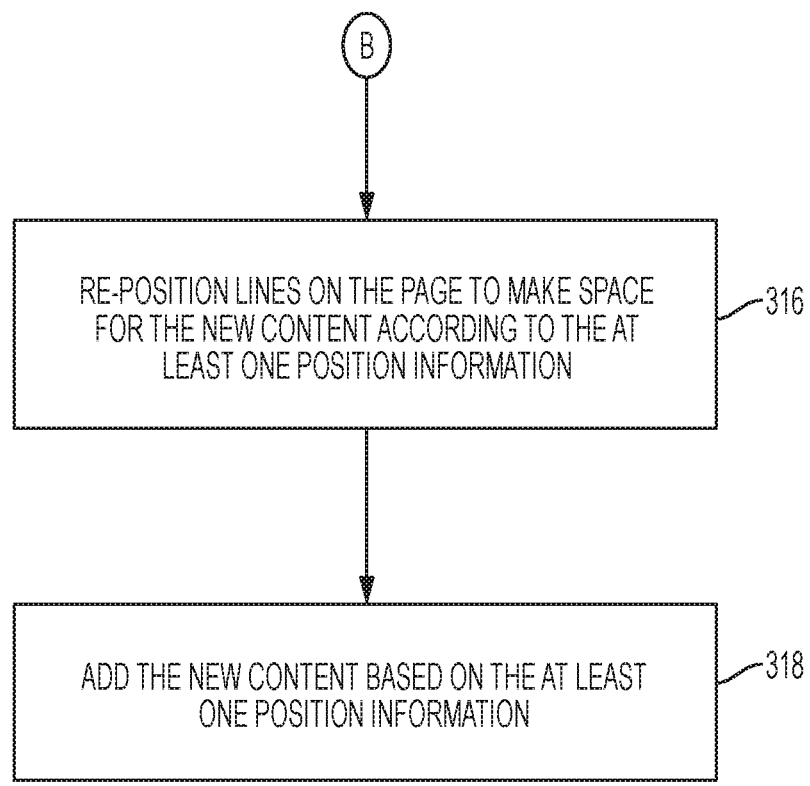

FIGS. 3A-3C represent a flowchart illustrating an exemplary method 300 for adding content in at least one page of an electronic document without moving current content to a next page in the electronic document, in accordance with an embodiment of the present disclosure. As discussed with reference to FIG. 1A, the user 102 may interact with the multi-function device 104 for adding new content in an electronic document. The user 102 may provide a first electronic document and at least one position information for adding a new content on a page of the first electronic document. The user 102 may also provide the new content via the user interface 204 of the MFD 202. Alternatively, the user 102 may select a second electronic document including the new content via the user interface 204. The second electronic document may be pre-stored in the MFD 202.

Further, the MFD 202 may add the new content in the first electronic document provided by the user 102.

At step 302, a first electronic document is received at the MFD 202. The user 102 may provide the first electronic document via the user interface 204 of the MFD 202. The user 102 may provide or submit the first electronic document such as a hardcopy document or a softcopy document, at the MFD 202. Alternatively, the user 102 may select the first electronic document via the user interface 204 at the MFD 202.

At step 304, at least one position information of a page of the first electronic document is received at the MFD 202. The user 102 may provide the position information. The at least one position information may include coordinate information of a position of the page where the new content is to be added.

Then at step 306, at least one of a new content and a selection of a second electronic document including the new content is received at the MFD 202. The user 102 may provide the new content or the selection of the second electronic document via the user interface 204 of the MFD 202. In some embodiments, the second electronic document and the first electronic document are pre-stored in the MFD 202. In alternative embodiments, the MFD 202 may receive the first and the second electronic documents from the computing device 108 via the network 106. The new content may include text, graphics, and image.

Then at step 308, a required space is estimated based on the new content. The required space represents one or more pixels needed for adding the new content. Further, the required space may define the one or more pixels occupied by the new content in the second electronic document. In some embodiments, the content processing module 206 of the MFD 202 estimates the required space. The required space is estimated based on a size of the new content present in the second electronic document.

At step 310, an available space is estimated based on a number of lines present on the page of the first electronic document. The available space may include a number of pixels, such as white pixels, available on the page, which may be utilized for adding new content. In some embodiments, the content processing module 206 estimates the available space. Then at step 312, the available space is compared with the required space to check if the available space is more than the required space. If yes then step 316 is executed else step 314 is executed. At step 314, the user 102 may be notified, such as via a text displayed at the user interface 204 and/or the computing device 108, that the space is not available on the page for adding the new content. The MFD 202 may notify the user 102 using suitable means such as, but not limited to, a text message, an audio message, a video message, or a combination of these.

At step 316, the lines of the page are re-positioned to make space for the new content according to the position information. The content processing module 206 re-positions the line of the page. Thereafter, at step 318, the new content is added on the page based on the position information. In some embodiments, the content processing module 206 adds the new content based on the position information.

Figure 4A:
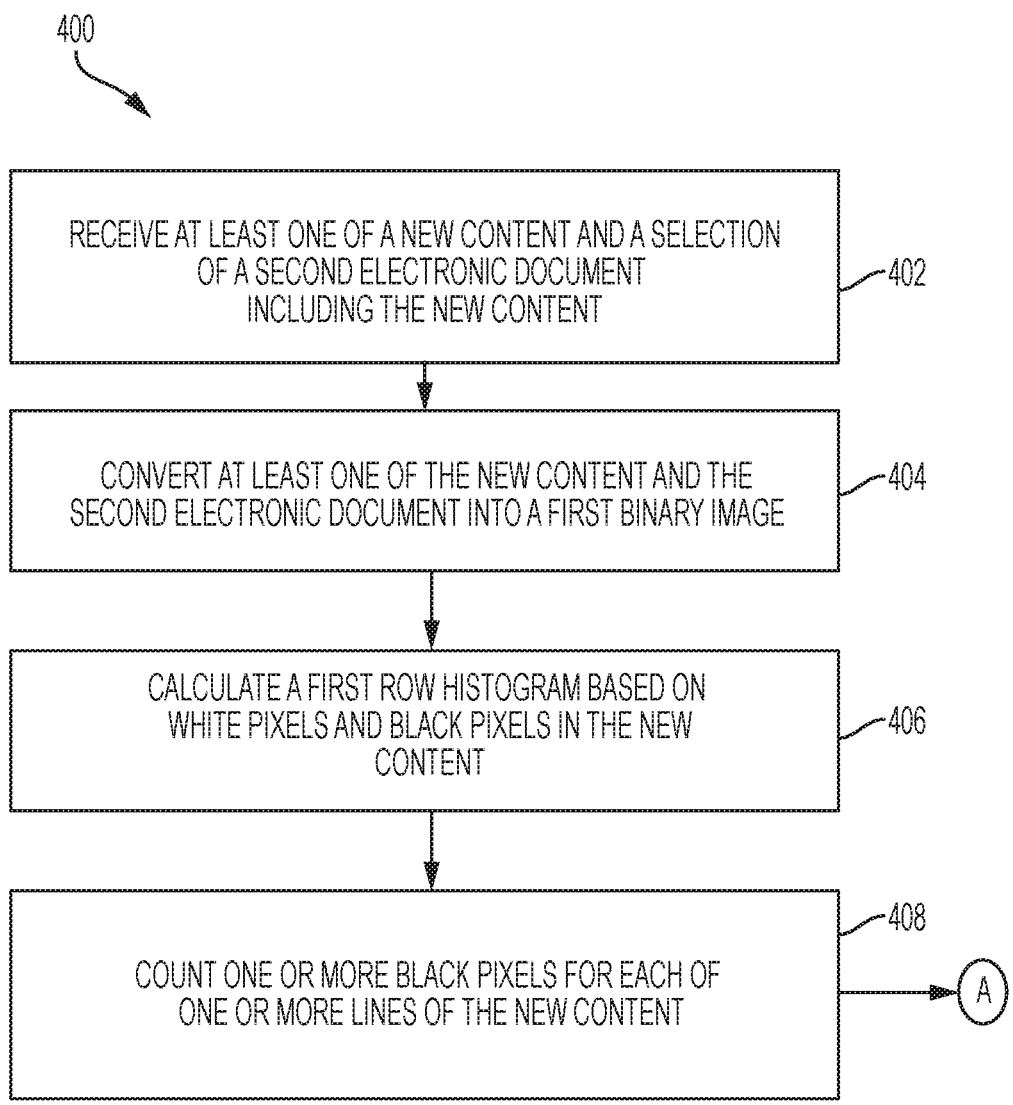
FIGS. 4A-4B represent a flowchart illustrating an exemplary method for estimating a required space for adding a new content, in accordance with an embodiment of the present disclosure.
Figure 4B:
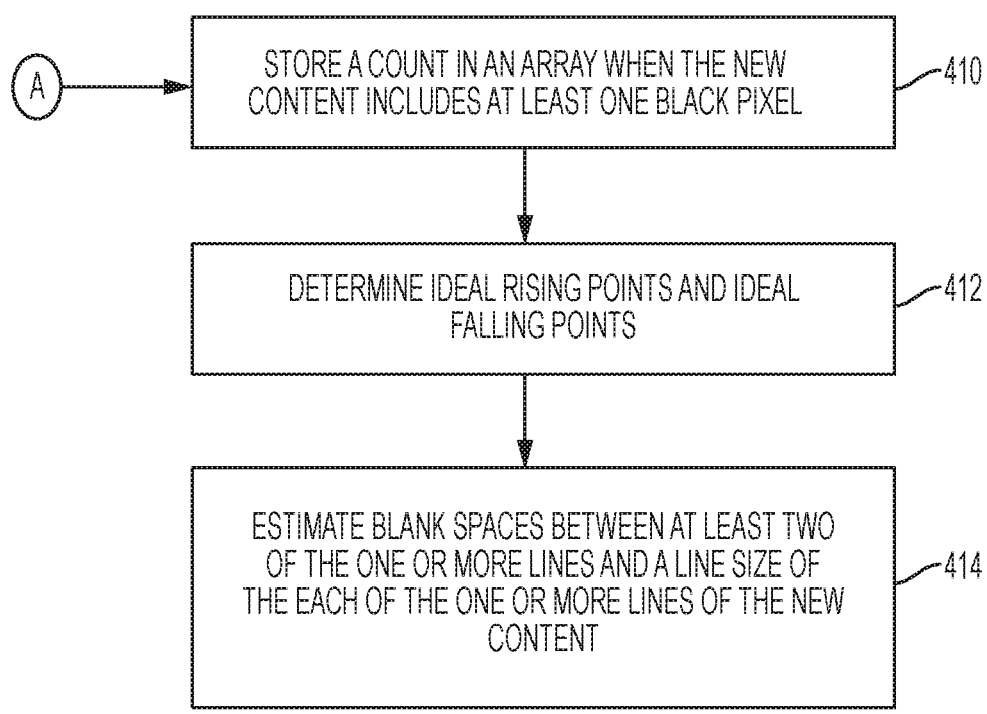

FIGS. 4A-4B represent a flowchart illustrating an exemplary method 400 for estimating a required space for adding a new content, in accordance with an embodiment of the present disclosure. At step 402, at least one of a new content and a selection of a second electronic document including the new content is received at the MFD 202. The user 102 may provide the new content and/or the selection of the second electronic document including the new content at the MFD 202. Then at step 404, at least one of the new content and the second electronic document including the new content is converted into a first binary image. The content processing module 206 may convert the at least one of the new content and the second electronic document including the new content into a first binary image.

Then at step 406, a first row histogram is calculated based on a number of white pixels and black pixels present in the new content. In some embodiments, the content processing module 206 may calculate the first row histogram. Further at step 408, one or more black pixels are counted for each of one or more lines of the new content. In some embodiments, the content processing module 206 counts the one or more black pixels present in the lines of the new content. If the content is black pixel, then number of black pixels is counted for every line (or row) from the first row histogram (Rh). This is represented by a first logic as follows:

$Rh(m)=count\ (I(m,*))$ where $I(m,*)==0$ and $0 \leq m \leq M$; where I represents an input image of dimension M*N (width*height), m represents every row from 0 to M.

Then at step 410, a count is stored in an array based on the counting. In some embodiments, the count is stored in an array in the memory 208. Further, the count is stored in the array when the new content includes at least one black pixel.

At step 412, a number of ideal rising points (i.e., RRp) and a number of ideal falling points (i.e., RRf) are determined from the first row histogram. The ideal rising points and the ideal falling points may include information about the one or more lines of the new content. The ideal rising points and the ideal falling points may help to mark the area of each of the lines. With this continuation, when the spike touches to zero that means an end of a spike and that point is considered to be an ideal falling point. Once an ideal falling point is encountered then with the same approach next ideal rising point is searched in the row histogram (Rh). A horizontal projection for black profile may generate a set of ideal rising and ideal falling points of same dimensions as discussed with reference to subsequent FIG. 6. The ideal rising points and the ideal falling points may contain the information of number of spikes that is considered to be the number of lines in the input image "I." From this information, a line size and line spaces may also be calculated by the content processing module 206.

Thereafter, at step 414, at least one blank space between at least two of the one or more lines of the new content and a line size of each of the one or more lines are estimated. The required space may include the at least one blank space and the line size of each of the one or more lines. In some embodiments, the content processing module 206 estimates the at least one blank space between at least two of the one or more lines of the new content. Further, the content processing module 206 may estimate the line size of each of the one or more lines. In some embodiments, the content processing module 206 may calculate a ratio, i.e., "K" for determining a size of the new content and/or space needed for the new content. In an exemplary scenario, the "K=0.9," then the ratio K is calculated by satisfying a second logic as follows:

While $(sum(LSI)-sum(round(LSI*K))) > Required\ Space)$ then $K=K-1$;

LSI represents line space of an image

In the second logic, a while loop is used, where LSI may represent a line space of the second electronic document and required space is the space or number of pixels needed for adding the new content. The second logic may also be used to estimate a gap between the lines of the first electronic document (and/or the second electronic document while estimating the required space).

Figure 5A:
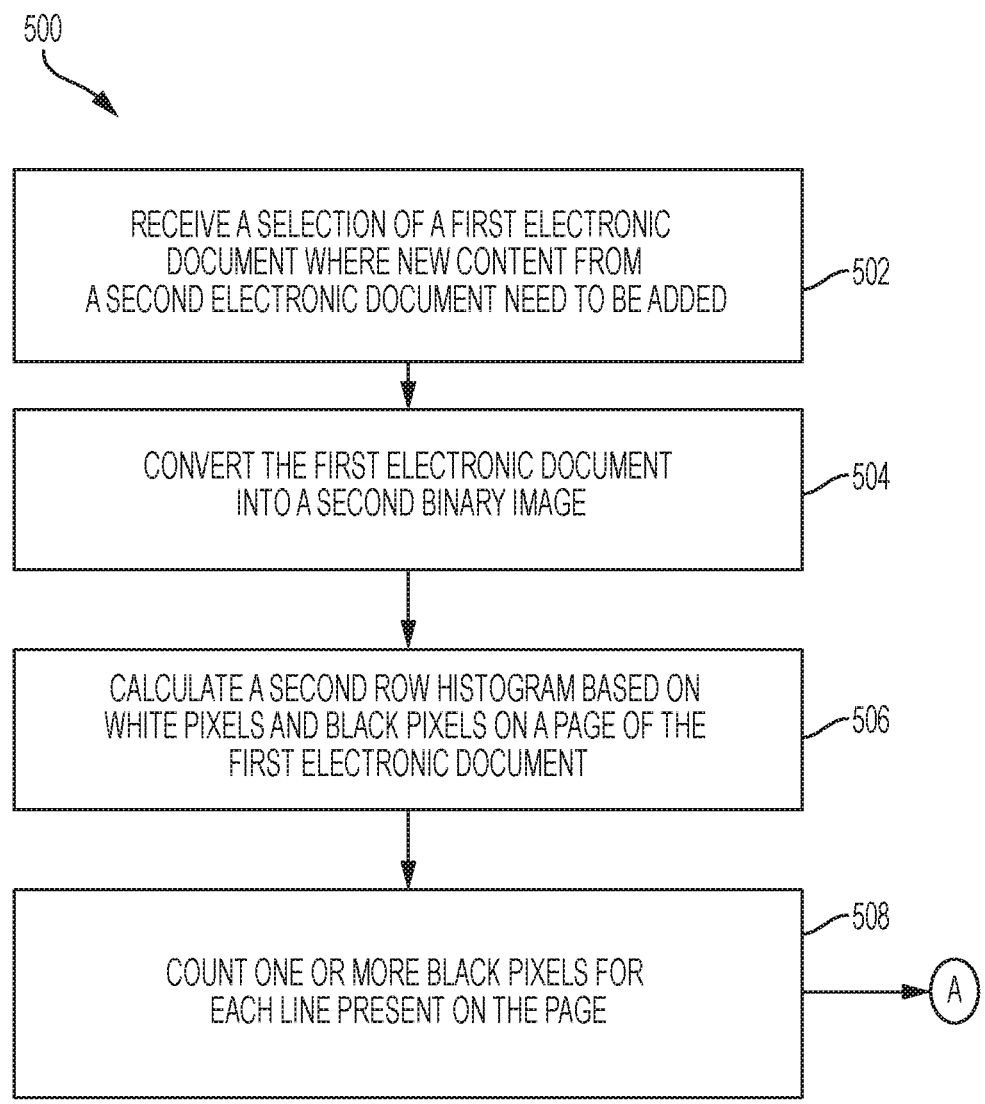
FIGS. 5A-5B represent a flowchart illustrating an exemplary method for estimating an available space on a page of a first electronic document, in accordance with an embodiment of the present disclosure.
Figure 5B:
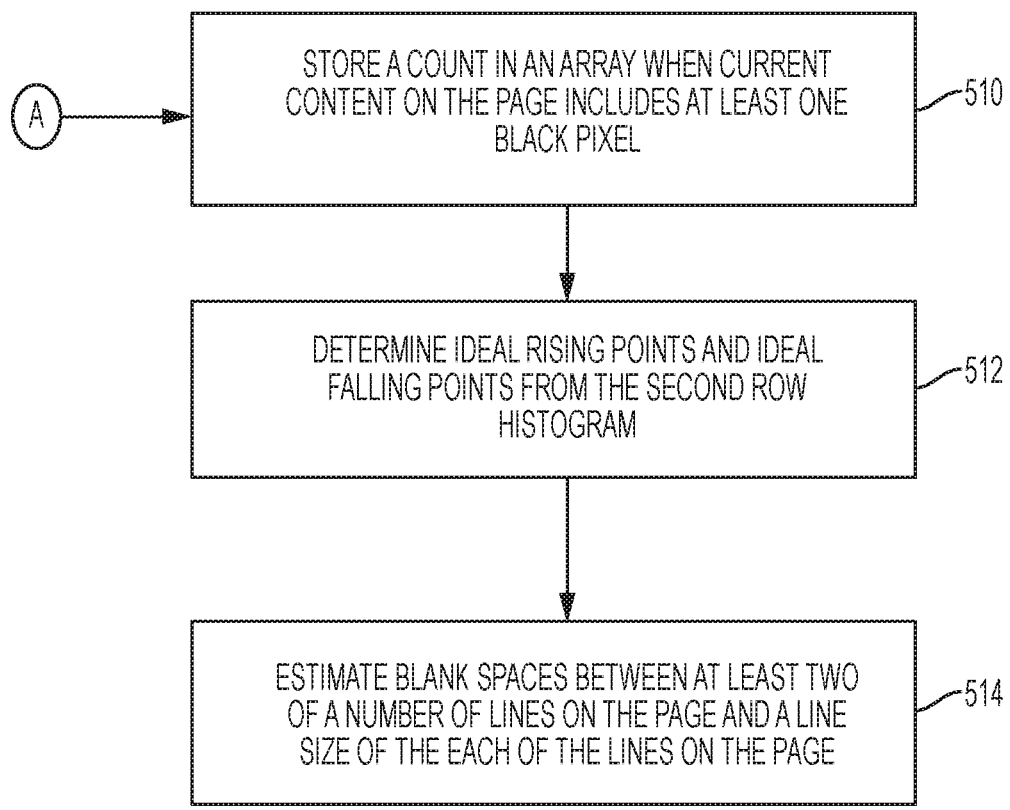

FIGS. 5A-5B represent a flowchart illustrating an exemplary method 500 for estimating an available space on a page of a first electronic document, in accordance with an embodiment of the present disclosure. At step 502, a first electronic document is received at the MFD 202. In some embodiments, the user 102 directly provides the first electronic document in form of a hardcopy or physical document at the MFD 202. In alternative embodiments, the user 102 may provide a selection of the first electronic document pre-stored at the MFD 202. In some other embodiments, the MFD 202 receives the first electronic document from the computing device 108 as discussed with reference to FIG. 1B.

Then at step 504, the first electronic document is converted into a second binary image. The content processing module 206 may convert the first electronic document into the second binary image. Then at step 506, a second row histogram is calculated based on a number of white pixels and a number of black pixels present on a page of the first electronic document. The content processing module 206 may calculate the second row histogram. Further at step 508, one or more pixels for each of a number of lines present on the page are counted. In some embodiments, the content processing module 206 counts the one or more pixels for each of the lines of the page. At step 510, a count based on the counting is stored in an array when current content of the page includes at least one black pixel. The count is stored in the memory 208 of the MFD 202.

Then at step 512, a number of ideal rising points and a number of ideal falling points are determined from the second row histogram. The ideal rising points and the ideal falling points may include information about the lines present in the page. In some embodiments, the content processing module 206 calculates the ideal rising points and the ideal falling points. Thereafter, at step 514, at least one blank space between at least two of the lines and a line size of each the lines of the page are estimated. The available space may include the at least one blank space. In some embodiments, the content processing module 206 estimates the at least one blank space and the line size.

Figure 6:
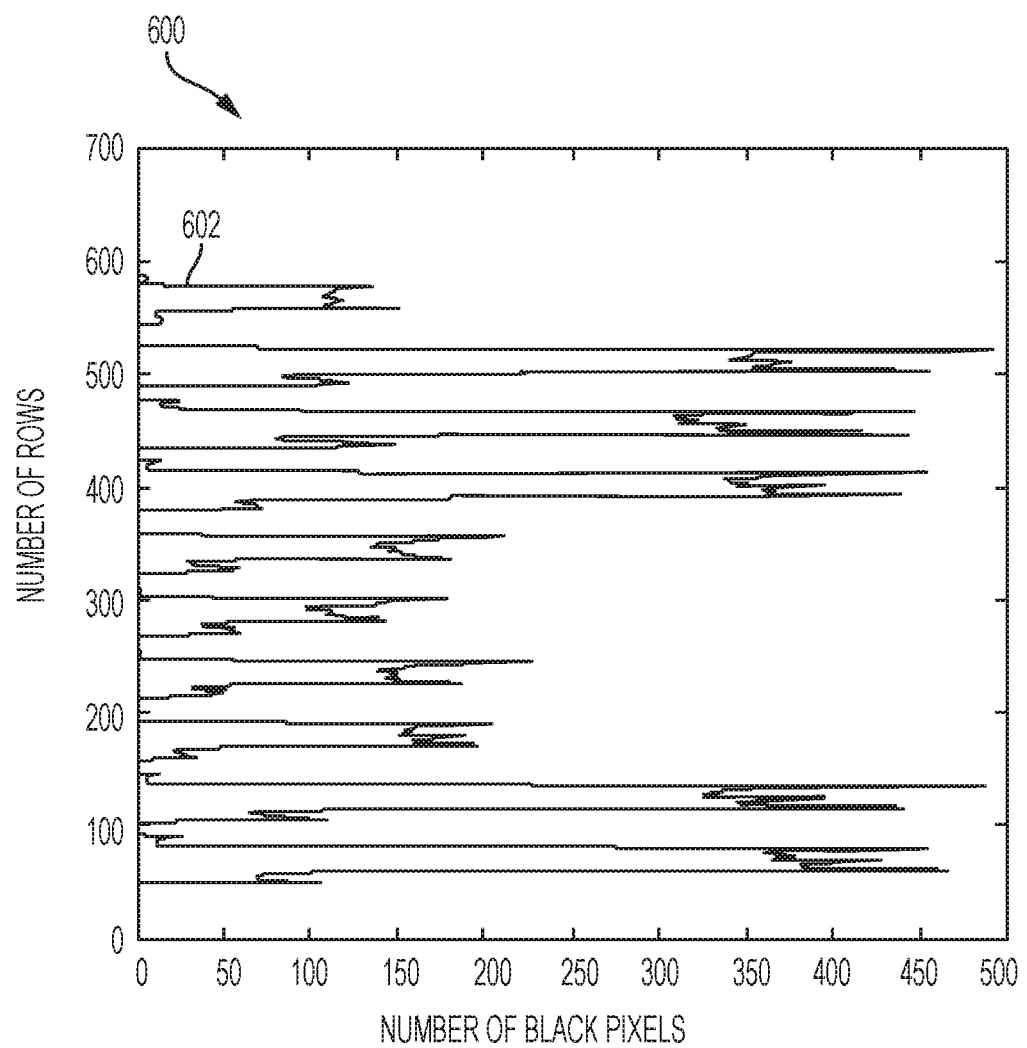
FIG. 6 illustrates an exemplary row histogram, in accordance with an embodiment of the present disclosure.

FIG. 6 illustrates an exemplary row histogram 600, in accordance with an embodiment of the present disclosure. In an exemplary scenario, an input image, i.e., "I" may have a dimension "M×N." The MFD 202 may receive the input image based on an input from the user 102. The content processing module 206 converts the input image (such as the second electronic document) into a binary image. A row histogram, i.e., the row histogram 600, is calculated bases on black and white pixels in the binary image. If the content is black pixel, then number of black pixels is counted for every line (or row) from the row histogram 600 (Rh) and is stored into an array. This is represented by a first logic as follows:

$$Rh(m) = count(I(m,*)) \text{ where } I(m,*) == 0 \text{ and } 0 \leq m \leq M$$

From the row histogram 600 (Rh), a number of ideal rising points (RRp) and ideal falling points (RFp) are determined that may help to mark the area of each of the lines. With this continuation, when the spike touches to zero that means an end of a spike and that point is considered to be an ideal falling point. Once an ideal falling point is encountered then with the same approach next ideal rising point is searched in the row histogram 600 (Rh). A horizontal projection for black profile may generate a set of ideal rising and ideal falling points of same dimensions.

The ideal rising points and the ideal falling points may contain the information of number of spikes (marked as 602) that is considered to be the number of lines in the input image "I." From this information, a line size and line spaces may also be calculated.

A first row histogram corresponding to a second electronic document and a second row histogram corresponding to a first electronic document is calculated. The first row histogram and the second row histogram are similar to the row histogram 600. As discussed with reference to FIG. 2, the content processing module 206 calculates the row histogram 600, the first row histogram and the second row histogram.

Figure 7E:
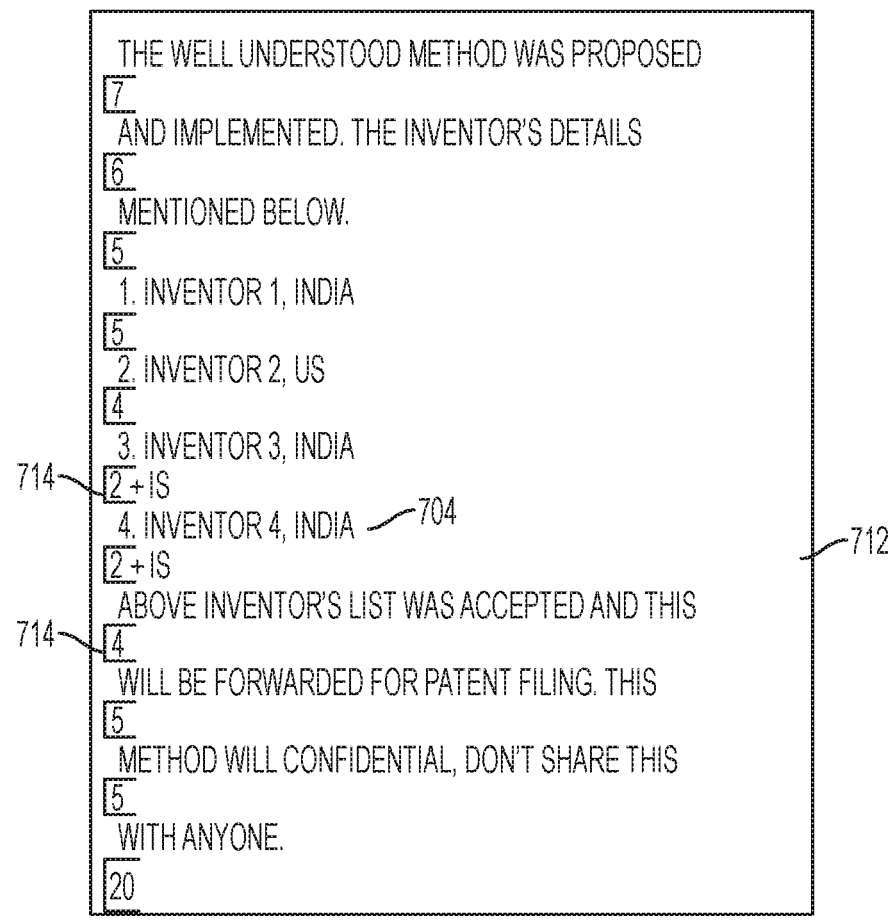

FIGS. 7A-7E show exemplary electronic documents at various stages of adding new content, in accordance with various embodiments of the present disclosure. FIG. 7A shows a second electronic document 702 including a new content 704. The user 102 may provide the second electronic document 702 as discussed with reference to FIGS. 1A-1B and FIG. 2 at the MFD 104. In some embodiments, the user 102 may provide the second electronic document 702 to the MFD 104 via the computing device 108. The new content 704 may include such as graphics, text, images, and so forth that need to be added in another electronic document.

FIG. 7B shows an exemplary first electronic document 706 in which the new content from the second electronic document 702 needs to be added. The first electronic document 706 is a scanned image provided at the MFD 104 by the user 102. In some embodiments, the first electronic document 706 is a pre-stored electronic document that may be selected by the user 102 at the MFD 104.

FIG. 7C depicts a page of the first electronic document 706 with a specified location 708 on the page where the new content 704 needs to be added. The user 102 specifies a location on the page of the first electronic document where exactly the new content needs to be added. The user 102 may specify the location by providing at least one position information of the page of the first electronic document 706. The position information may include position coordinates of the page. In some embodiments, the user 102 may specify the position information by moving a cursor on the page of the first electronic document via the user interface 204.

The content processing module 206 estimates a required space needed for adding the new content 704 based on a size of the new content 704. The content processing module 206 also estimates an available space on the page of the first electronic document that is used for adding any additional content. In some embodiments, the content processing module 206 creates one or more row histograms for estimating an available space and required space. The content processing module 206 also calculates a number of ideal rising points (RRp) and a number of ideal falling points (RRf) as discussed with reference to FIG. 6. The ideal rising points (RRp) and ideal falling points (RRf) contain information about a number of spikes in a first row histogram corresponding to the second electronic document. The number of spikes is considered as number of lines in the electronic document such as the second electronic document 702. This way the content processing module 206 may calculate a line size and line spaces.

The line size and number of lines information are calculated for the second electronic document from the first row histogram. Similarly, a line size and number of lines information is calculated for a first electronic document from the second row histogram. A new content from the second electronic document is extracted and added into the first electronic document based on at least one position information provided by the user 102.

The content processing module 206 checks if the available space is more than (or equal to) the required space. If yes, then the content processing module 206 re-positions one or more lines of the page to make space 710 for the new content 704. In some embodiments, when the available space is more than the required space then, the new content is added by moving current content of the first electronic document on the page. In some embodiments, when the available space is less than or equal to the required space then, one or more margins from the page of the first electronic document is removed or utilized for re-positioning the current lines including the current content of the page. The line space of the first electronic document is minimized to make space available for the new content. In other embodiments, when the available space is not enough for adding the new content even after removing the one or more margins then a font size (and/or a font type) of the current content of the page is reduced to make space available for the new content on the page. Also when the space cannot be made available by removing margins and by decreasing the font size, then a notification message is presented to the user 102 that the space is not available for adding the new content.

The content processing module 206 calculates a ratio, i.e., "K," for checking whether the available space on the page of the first electronic document is large enough to accommodate the new content. In an exemplary scenario, the ratio is defined as "K=0.9," then the ratio is calculated by satisfying the second logic as follows:

While (sum(LSI)−sum(round(LSI*$K$)))>Required Space) then $K=K-1$

In the second logic, a while loop is used, where LSI may represent a line space of the second electronic document and required space is the space or number of pixels needed for adding the new content. For estimating a line size and the available space, every line in the first electronic document is reduced according to the ratio, i.e., "K." Then, based on the at least one position information entered by the user 102, the white space 710 is added first as shown in FIG. 7D, then the new content is added on the page of the first electronic document. The whitespace 710 equal to the required space is added at the specified location 708.

The second logic may also be used to estimate a gap between the lines of the first electronic document (and/or the second electronic document while estimating the required space).

FIG. 7E shows an updated first electronic document 712 including the new content 704 added according to the position information. The content processing module 206 adds the new content on the page of the first electronic document 706 according to the position information. A number of pixels 714 between the lines on the page may also be calculated based on the second logic by the content processing module 206.

Figure 8A:
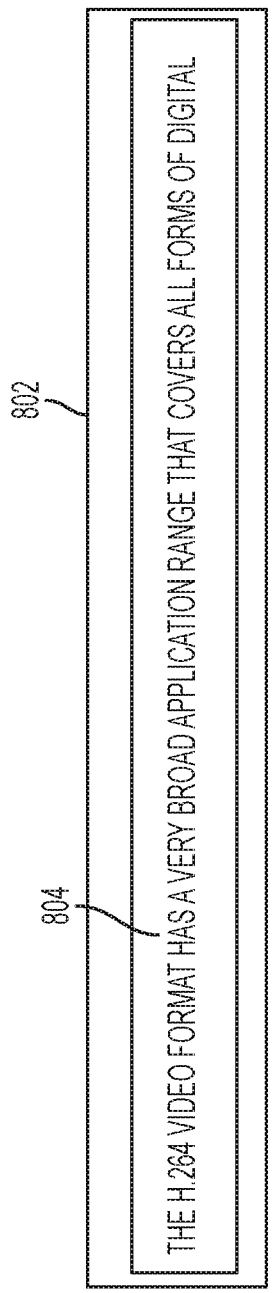
Figure 9A:
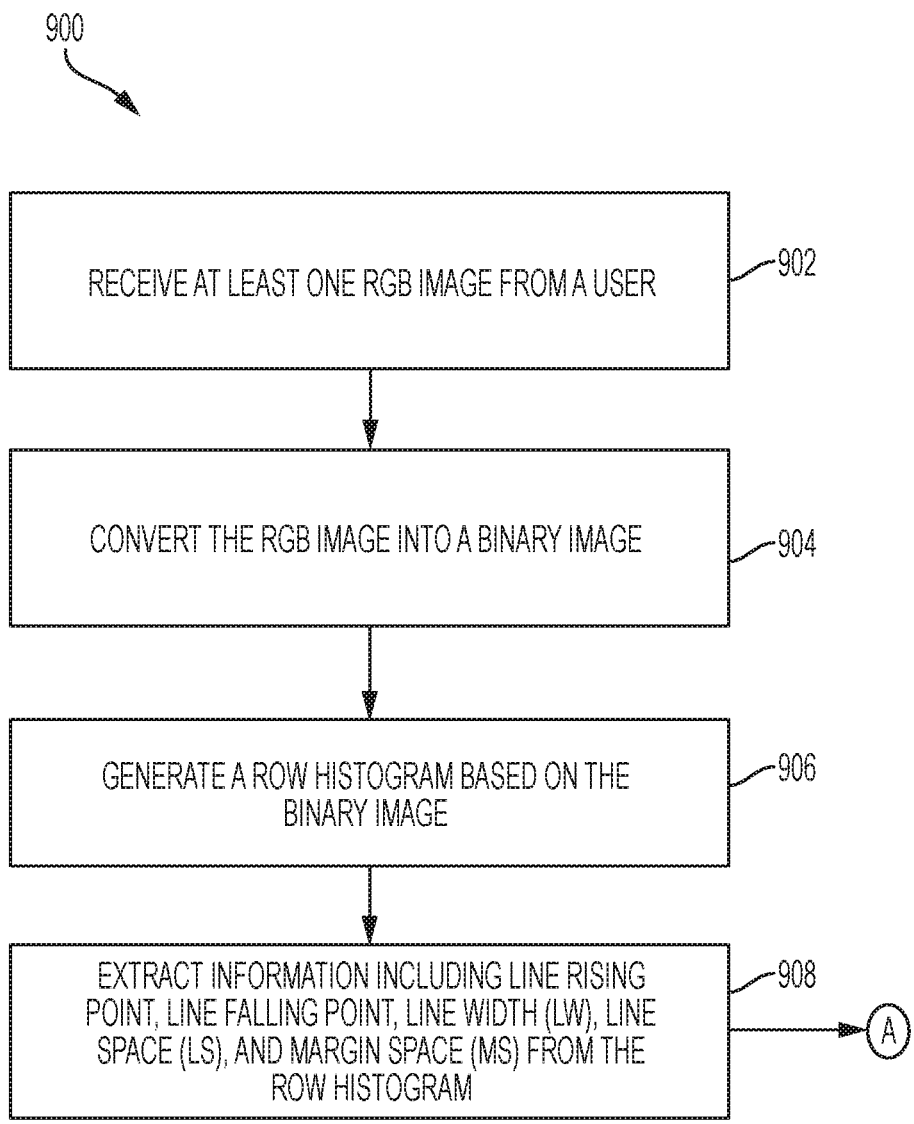
FIGS. 9A-9D represent a flowchart illustrating an exemplary method for adding content in a scanned image, in accordance with an embodiment of the present disclosure.
Figure 9B:
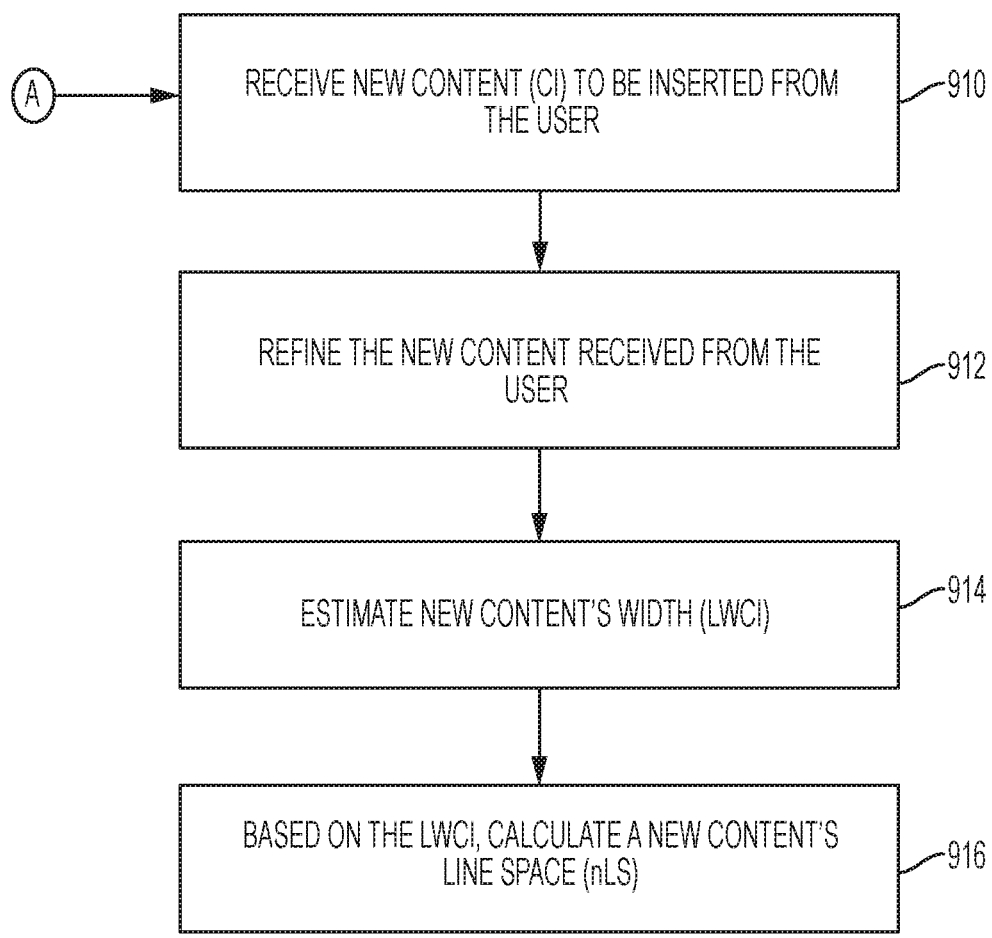
Figure 9C:
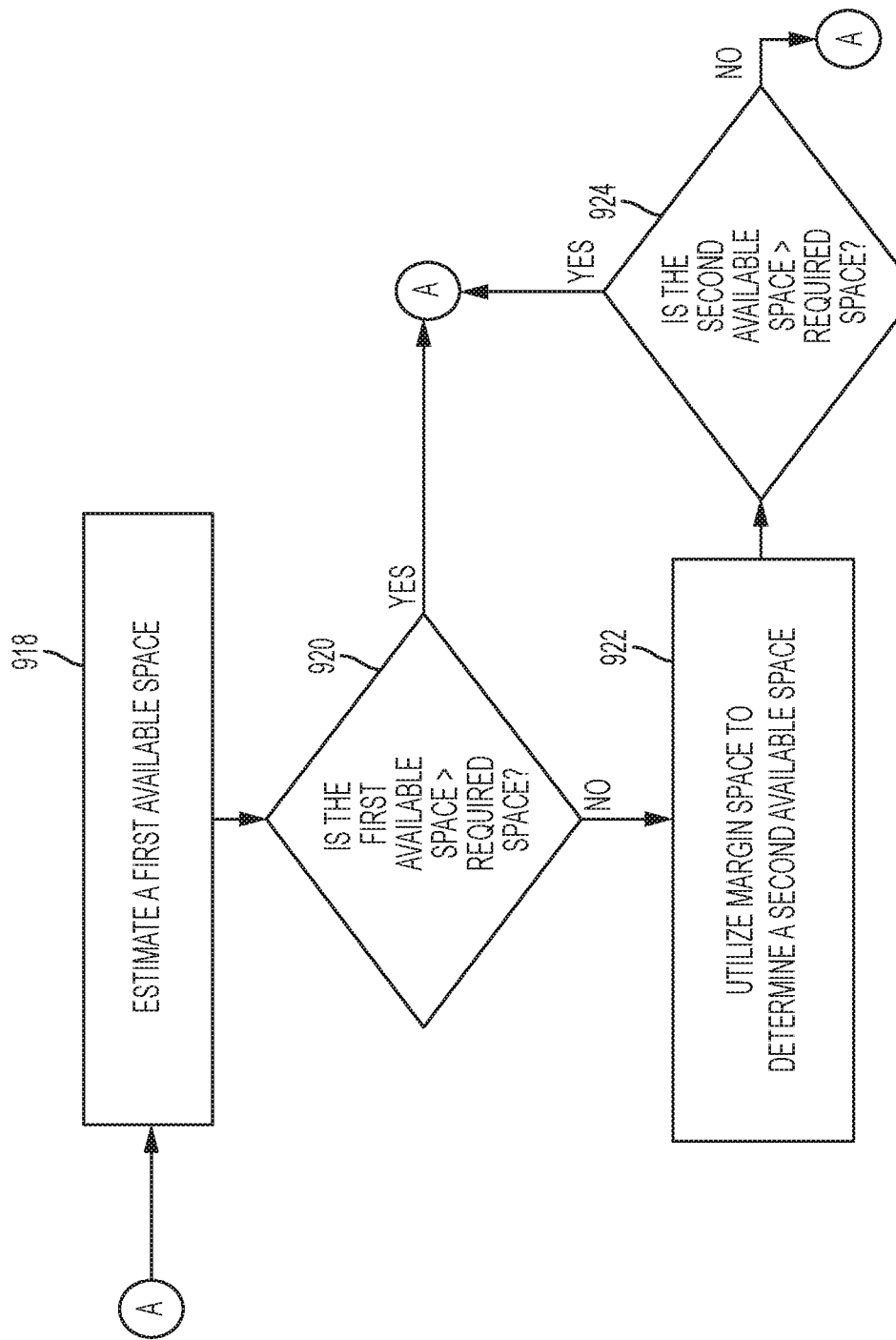
Figure 9D:
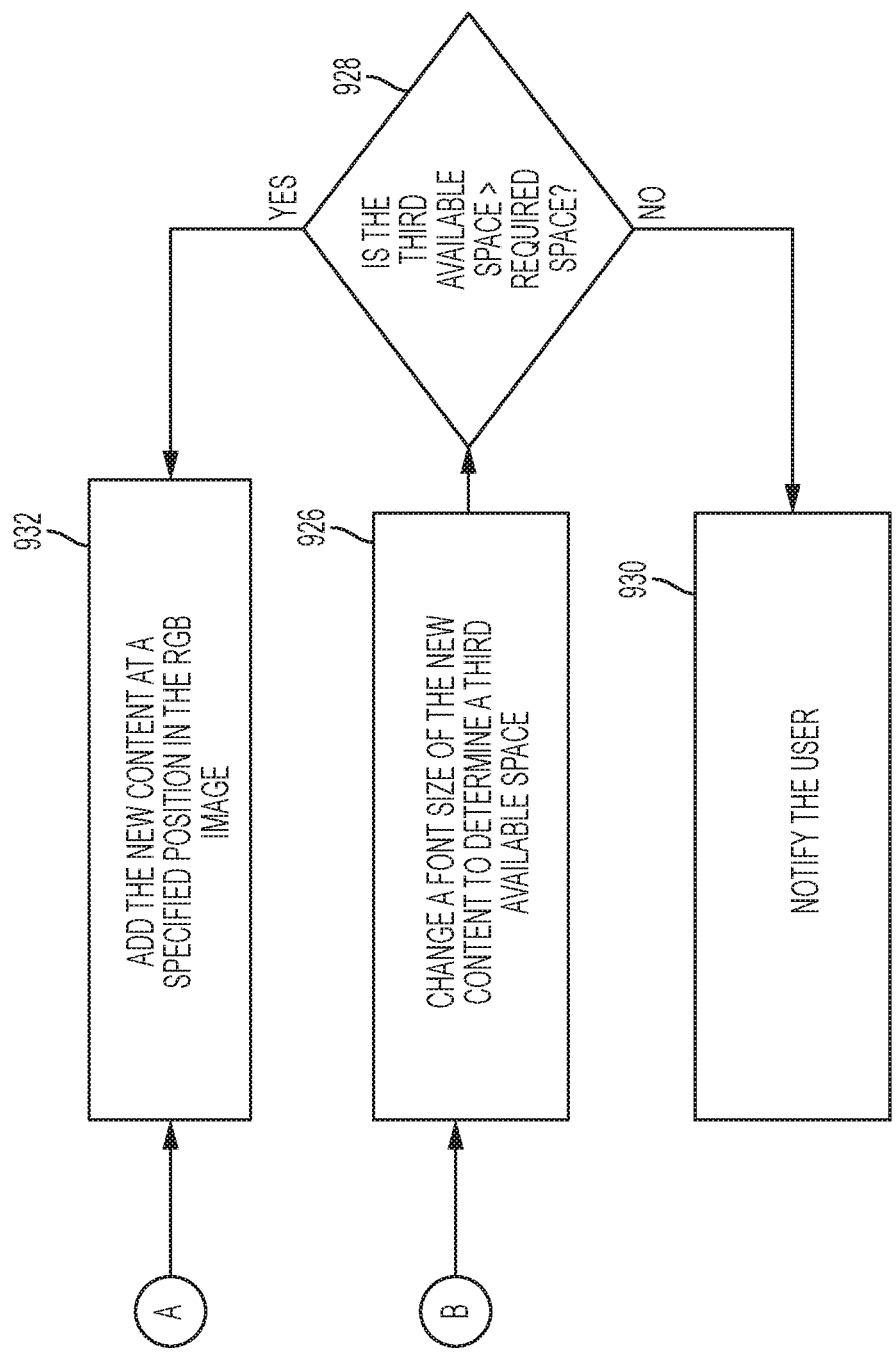

FIG. 8A illustrates a second electronic document 802 including a new content 804. The user 102 provides the new content 804 via the user interface 204 of the MFD 202. FIG. 8B illustrates a first electronic document 806 in which the new content of the second electronic document 802 needs to be added. The user provides position information for adding the new content at a position 808 on a page of the first electronic document 806. FIG. 8C illustrates an updated first electronic document 810 with added new content 804 at the position 808.

FIGS. 9A-9D represent a flowchart 900 illustrating an exemplary method for adding content in a scanned image, in accordance with an embodiment of the present disclosure.

At step 902, an RGB image (or an electronic document) is received from a user. At step 904, the RGB image is converted into a binary image. Then at step 906, a row histogram is generated based on the binary image. The row histogram is a row wise horizontal profile plotted from the binary image.

Then at step 908, from the horizontal projection profile plot following information are extracted: Line raising points (line rising points), Line falling points, and so forth. From the line falling points and the line raising points, a Line Width (LW), a line space (LS), and a margin space (MS) are determined. The line width is a width of each text line in the image. The line Space (LS) is empty space between each text line in the image. Similarly, the margin space (MS) is space in top and bottom of the image (i.e., the electronic document).

Then at step 910, new content (CI) that needs to be inserted into the image is received from the user. At step 912, the received new content (CI) is refined. For example, the empty line/space in the top and bottom from the new content is removed. The empty lines i.e. the line space and line width in the new content is determined by executing steps 904 to 908 for the new content At step 914, a new content's line width (i.e., LWCI) is estimated. Based on the new content's line width (LWCI), a new content's line space (i.e., nLS) is estimated at step 916.

Then at step 918, a first available space is estimated. In some embodiments the first available space is calculated as follows:

```
For (K (ratio) =0.9 ; K>=0.6; K=K− 0.1 )
{
    If (nLS = sum ( LS * k ) > = LWCI )
        Goto Step 932
    Else, if K == 0.6
        Goto step 922
```

Then at step 920, it is checked whether the first available space is greater than required space. The required space is space or number of pixels required for inserting the new content in the image. If yes then step 932 is executed else step 922 is executed. At step 922, margin space on the binary image is utilized to estimate a second available space. Then at step 924, it is checked whether the second available space is greater than the required space. If yes, then the step 932 is executed else step 926. The step 924 is executed as follows:

```
If nLS (numbers of line space) = sum (MS + nLS )> = LWCI
    Goto Step 932
Else
    Goto step 922
```

At step 926, a font size (and/or text formatting) of the binary image is changed, for example decreased, to generate a third available space. Then at step 928, it is checked whether the third available space is more than the required space. If yes, then the step 932 is executed, else step 930 is executed. The step 928 is executed as follows:

```
If nLS = sum ( ( LW * 0.9) +MS + nLS ) >= LWCI
    Goto Step 932
Else
    Goto step 930
```

At step 932, the new content is added at a specified position in the RGB image. The user specifies the position by providing position information. At step 930, the user is notified about unavailability of the space for the new content in the RGB image.

Figures 10A, 10B:
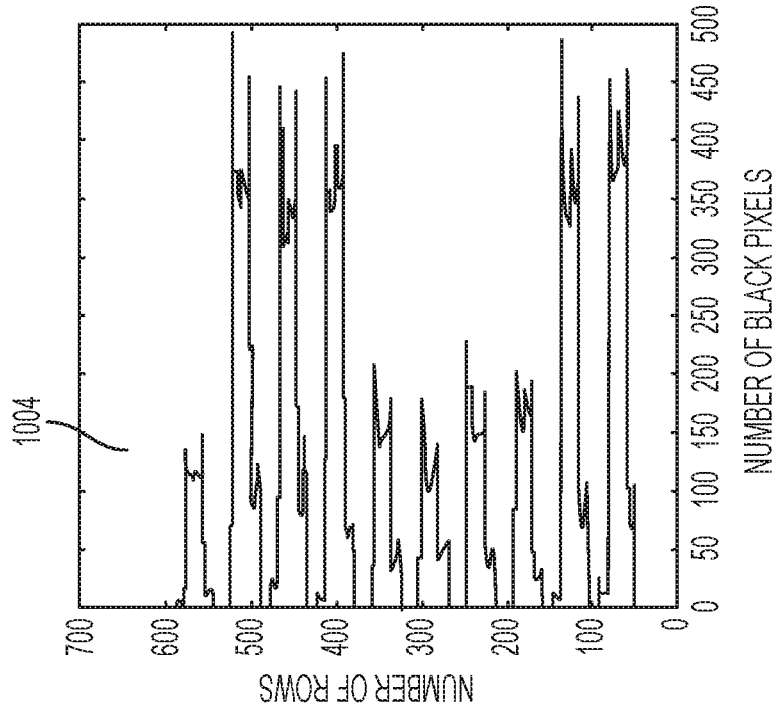
FIG. 10A illustrates a binary image, in accordance with an embodiment of the present disclosure.
FIG. 10B illustrates a row histogram corresponding to the binary image of FIG. 10A.
Figure 10C:
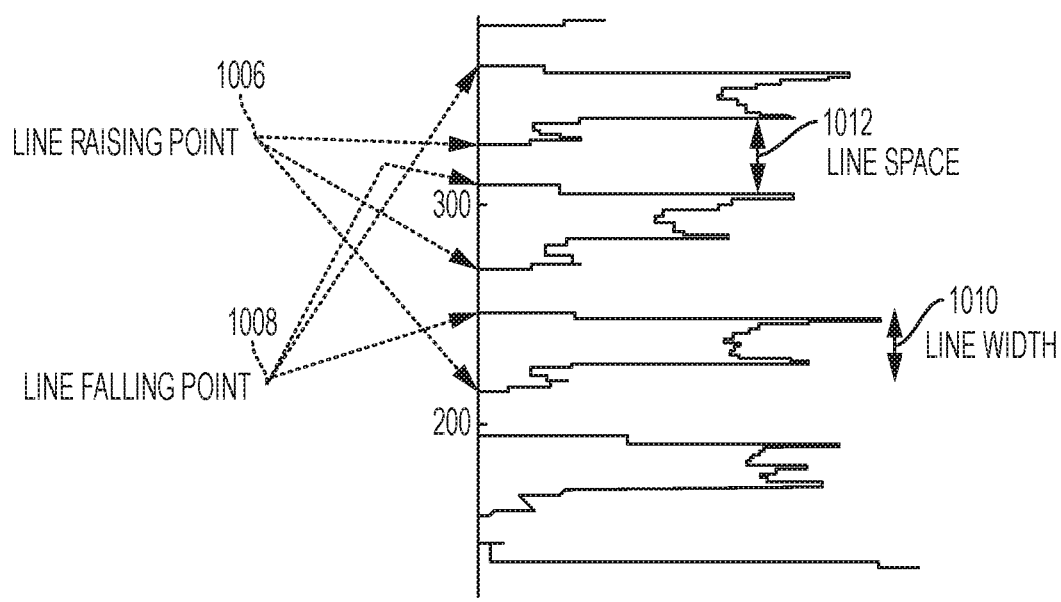
FIG. 10C illustrates a number of line raising points and a number of line falling points determined from the row histogram of FIG. 10B.

FIG. 10A shows an exemplary binary image 1002 corresponding to an input image (such as an electronic document) received from a user, in accordance with an embodiment of the present disclosure. FIG. 10B shows a row histogram 1004 generated based on the binary image 1002. FIG. 10C shows a number of line raising points 1006 and a number of line falling points 1008 determined from the row histogram 1004. Based on the line raising points 1006 and the line falling points 1008, a line space (LS) 1010 and a line width (LW) 1012 are determined. As mentioned above, the line width 1012 refers to a width of each text line in the image. The line space 1012 is empty space between the each text line in the image.

The disclosed system is configured to add and accommodate new content in the page of a first electronic document without moving current content of the page to the next page.

The disclosed system estimates the available space by calculating the line space in a scanned image (or document) or an electronic document. Based on the available space, the user enters the new content. In case the entered new content is more than the available space, then a notification message is presented to the user.

The disclosed system enables addition of the new content in an electronic document by giving high importance to a layout of the electronic document, its appearance, and so forth. The disclosed system allows addition of the new content without altering the layout of the electronic document.

The disclosed system utilizes space between every line in an electronic document for adding the new content.

The disclosed system enables insertion of scanned text into an already existing text block of a scanned image i.e. an electronic document. The disclosed system includes MFD for detecting white rows in the scanned image and removing enough white space to create room for insertion of new text or content.

The disclosed system detects white spaces on a page only, so that in a multi-page document no new page is added.

The disclosed system identifies text lines by using already known row average and threshold mechanism.

The disclosed system allows insertion of text into a scanned image (or electronic document) without the need for Optical Character Recognition (OCR).

The disclosed system does not require information of a font size of a current content on a page of the electronic document or type of the new content.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "receiving," or "displaying," or "storing," or "changing," "or sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adding content in at least one page of an electronic document, the method comprising:
   receiving a first electronic document, wherein the first electronic document is an electronic document generated by scanning a first physical document;
   receiving at least one position information of a page of the first electronic document where a new content need to be added;
   receiving a second electronic document comprising the new content from a user, wherein the second electronic document is an electronic document generated by scanning a second physical document;
   estimating a required space comprising one or more pixels required for adding the new content based on the new content, wherein the estimating the required space comprises:
      converting the second electronic document including the new content into a first binary image,
      calculating a first row histogram based on a first plurality of white pixels and a first plurality of black pixels present in the new content,
      counting one or more black pixels for each of one or more first lines of the new content, and storing a first count based on the counting, wherein the first count is stored in one or more arrays when the new content comprises at least one black pixel,
      determining a first plurality of rising points and a first plurality of falling points from the first row histogram, wherein the first plurality of rising points and the first plurality of falling points define one or more first spikes in the first row histogram, the one or more first spikes corresponding to the one or more first lines, and the first plurality of rising points and the first plurality of falling points comprise first information about the one or more first lines of the new content, and
      estimating at least one first blank space between at least two of the one or more first lines and a first line size of each of the one or more first lines of the new content from the first information, wherein the required space comprises the at least one first blank space and the first line size of each of the one or more first lines;
   estimating an available space comprising a plurality of pixels available between a plurality of lines present in the page of the first electronic document;
   re-positioning the plurality of lines of the page to make space for the new content based on the estimated required space for adding the new content and the estimated available space between the plurality of lines;
   adding the new content, extracted from the second electronic document, on the page of the first electronic document based on the received at least one position information to generate an updated first electronic document comprising the added new content, wherein the new content is added on the page of the first electronic document, without moving current content to a next page of the first electronic document.

2. The method of claim 1 further comprising printing the updated first electronic document comprising the added new content.

3. The method of claim 1 further comprising saving the updated first electronic document comprising the added new content.

4. The method of claim 1 further comprising sharing the updated first electronic document comprising the added new content with one or both of other computing devices and other users via a network.

5. The method of claim 1, wherein estimating the available space further comprising:
converting the first electronic document into a second binary image;
calculating a second row histogram based on a second plurality of white pixels and a second plurality of black pixels present on the page of the first electronic document;
counting one or more black pixels for each of the plurality of lines present on the page, wherein a second count based on the counting is stored in the one or more arrays when current content of the page comprises at least one black pixel;
determining a second plurality of rising points and a second plurality of falling points from the second row histogram, wherein the second plurality of rising points and the second plurality of falling points define one or more second spikes in the second row histogram, the one or more second spikes corresponding to the plurality of lines present in the page, and the second plurality of rising points and the second plurality of falling points comprise second information about the plurality of lines present in the page; and
estimating at least one second blank space between at least two of the plurality of lines and a second line size of each the plurality of lines of the page from the second information, wherein the available space includes the at least one second blank space.

6. The method of claim 5 further comprising changing a font size of the current content of the page to make space for adding the new content on the page when the available space is at least one of an equal to and less than the required space.

7. The method of claim 1, wherein the new content comprises one or more of an image, text, and graphics.

8. The method of claim 1 further comprising re-positioning the plurality of lines such that one or more margins of the page of the first electronic document are utilized for making space available equal to the required space for adding the new content.

9. A system for adding content in at least one page of an electronic document, the system comprising a multi-function device configured to:
receive a first electronic document, wherein the first electronic document is an electronic document generated by scanning a first physical document;
receive at least one position information of a page of the first electronic document where new content is to be added;
receive a second electronic document comprising the new content from a user, wherein the second electronic document is an electronic document generated by scanning a second physical document, and
wherein the multi-function device further comprises a content processing module configured to:
estimate a required space comprising one or more pixels required for adding the new content, wherein the estimating the required space comprises:
converting the second electronic document including the new content into a first binary image,
calculating a first row histogram based on a first plurality of white pixels and a first plurality of black pixels present in the new content,
counting one or more black pixels for each of one or more first lines of the new content, and storing a first count based on the counting, wherein the first count is stored in one or more arrays when the new content comprises at least one black pixel,
determining a first plurality of rising points and a first plurality of falling points from the first row histogram, wherein the first plurality of rising points and the first plurality of falling points define one or more first spikes in the first row histogram, the one or more first spikes corresponding to the one or more first lines, and the first plurality of rising points and the first plurality of falling points comprise first information about the one or more first lines of the new content, and
estimating at least one first blank space between at least two of the one or more first lines and a first line size of each of the one or more first lines of the new content from the first information, wherein the required space comprises the at least one first blank space and the first line size of each of the one or more first lines;
estimate an available space comprising a plurality of pixels available between a plurality of lines present in the page of the first electronic document;
re-position the plurality of lines of the page to make space for the new content based on the estimated required space for adding the new content and the estimated available space between the plurality of lines;
extract the new content from the second electronic document; and
add the new content, extracted from the second electronic document, on the page of the first electronic document based on the received at least one position information to generate an updated first electronic document comprising the added new content, wherein the new content is added on the page of the first electronic document, without moving current content to a next page of the first electronic document.

10. The system of claim 9, wherein the multi-function device is further configured to print the updated first electronic document comprising the added new content.

11. The system of claim 9, wherein the multi-function device is further configured to save the updated first electronic document comprising the added new content.

12. The system of claim 9, wherein the multi-function device is further configured to share the updated first electronic document comprising the added new content with one or both of other computing devices and other users via a network.

13. The system of claim 9, wherein the content processing module is further configured to estimate the available space by:
converting the first electronic document into a second binary image;
calculating a second row histogram based on a second plurality of white pixels and a second plurality of black pixels present on the page of the first electronic document;
counting one or more black pixels for each of the plurality of lines present on the page, wherein a second count based on the counting is stored in the one or more arrays when current content of the page comprises at least one black pixel;

determining a second plurality of rising points and a second plurality of falling points from the second row histogram, wherein the second plurality of rising points and the second plurality of falling points define one or more second spikes in the second row histogram, the one or more second spikes corresponding to the plurality of lines present in the page, and the second plurality of rising points and the second plurality of falling points comprises second information about the plurality of lines present in the page; and estimating at least one second blank space between at least two of the plurality of lines and a second line size of each the second plurality of lines of the page from the second information, wherein the available space includes the at least one second blank space.

14. The system of claim 13, wherein the content processing module is further configured to change a font size of the current content of the page to make space for adding the new content on the page when the available space is at least one of an equal to and less than the required space.

15. The system of claim 9, wherein the new content comprises one or more of an image, text, and graphics.

16. The system of claim 9, wherein the content processing module is further configured to re-position the plurality of lines such that one or more margins of the page of the first electronic document are utilized for making space available equal to the required space for adding the new content.

* * * * *